(12) United States Patent
Choi et al.

(10) Patent No.: US 11,003,293 B2
(45) Date of Patent: May 11, 2021

(54) ELECTRONIC DEVICE THAT EXECUTES ASSIGNED OPERATION IN RESPONSE TO TOUCH PRESSURE, AND METHOD THEREFOR

(71) Applicant: Samsung Electronics Co., Ltd., Gyeonggi-do (KR)

(72) Inventors: Mee Ryung Choi, Seoul (KR); Keun Sik Lee, Gyeonggi-do (KR); Hye Won Im, Seoul (KR); Moo Young Kim, Seoul (KR); Ki Huk Lee, Gyeonggi-do (KR); Seung Won Cha, Gyeonggi-do (KR); Ho Chul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/620,586

(22) PCT Filed: May 29, 2018

(86) PCT No.: PCT/KR2018/006082
§ 371 (c)(1),
(2) Date: Dec. 9, 2019

(87) PCT Pub. No.: WO2018/225974
PCT Pub. Date: Dec. 13, 2018

(65) Prior Publication Data
US 2020/0125215 A1 Apr. 23, 2020

(30) Foreign Application Priority Data

Jun. 9, 2017 (KR) .......................... 10-2017-0072340

(51) Int. Cl.
*G06F 3/044* (2006.01)
*G06F 3/0484* (2013.01)
*G06F 3/0488* (2013.01)

(52) U.S. Cl.
CPC .. *G06F 3/0443* (2019.05); *G06F 2203/04104* (2013.01)

(58) Field of Classification Search
USPC ........................................................ 345/174
See application file for complete search history.

(56) References Cited

U.S. PATENT DOCUMENTS 8,334,850 B2   12/2012   Tsai
9,262,002 B2   2/2016   Momeyer et al.
(Continued)

FOREIGN PATENT DOCUMENTS

KR   10-2011-0086502 A   7/2011
KR   10-2011-0088279 A   8/2011
(Continued)

*Primary Examiner* — Chineyere D Wills-Burns
(74) *Attorney, Agent, or Firm* — Cha & Reiter, LLC.

(57) ABSTRACT

An electronic device and method are disclosed. The electronic device includes a memory, a display, a touch sensor included in the display or coupled to the display, and configured to sense a touch. A pressure sensor configured to detect a pressure value of the touch and a processor electrically connected with the memory, the display, the touch sensor, and the pressure sensor, wherein the processor is configured to sense a first touch having a pressure value of a specified threshold value or greater, by using the touch sensor and the pressure sensor, store first location data of the first touch in the memory, sense a second touch, by using the touch sensor and the pressure sensor, wherein the second touch has a pressure value of the specified threshold value or greater and is made after sensing the first touch and perform a specified operation of utilizing the first location data and (Continued)

second location data of the second touch as an input, in response to sensing the second touch.

14 Claims, 12 Drawing Sheets

(56) References Cited

U.S. PATENT DOCUMENTS

| | | | |
|---|---|---|---|
| 9,645,732 B2 | 5/2017 | Butcher et al. | |
| 10,168,886 B2 | 1/2019 | Kim et al. | |
| 10,387,029 B2 | 8/2019 | Butcher et al. | |
| 2010/0026647 A1* | 2/2010 | Abe | G06F 3/04883 345/173 |
| 2010/0229091 A1* | 9/2010 | Homma | G06F 3/04883 715/702 |
| 2010/0277432 A1* | 11/2010 | Tsai | G06F 3/04883 345/174 |
| 2012/0105358 A1 | 5/2012 | Momeyer et al. | |
| 2012/0274662 A1* | 11/2012 | Kim | G11B 27/34 345/650 |
| 2013/0063364 A1* | 3/2013 | Moore | G06F 3/04883 345/173 |
| 2014/0365215 A1* | 12/2014 | Kim | G10L 15/22 704/235 |
| 2015/0015526 A1* | 1/2015 | Wang | G06F 3/0446 345/174 |
| 2015/0277698 A1* | 10/2015 | Pakhchanian | G06K 9/033 715/863 |
| 2016/0062600 A1* | 3/2016 | Kim | G06F 3/0482 715/765 |
| 2016/0066149 A1* | 3/2016 | Pahwa | G06F 3/0488 455/456.3 |
| 2016/0195989 A1* | 7/2016 | Czelnik | G06F 3/0416 345/174 |
| 2016/0259495 A1 | 9/2016 | Butcher et al. | |
| 2016/0370910 A1* | 12/2016 | Park | G06F 3/0416 |
| 2018/0046303 A1* | 2/2018 | Weng | G06F 3/04166 |

FOREIGN PATENT DOCUMENTS

| | | |
|---|---|---|
| KR | 10-1119759 B1 | 3/2012 |
| KR | 10-2016-0025629 A | 3/2016 |

* cited by examiner

ELECTRONIC DEVICE THAT EXECUTES ASSIGNED OPERATION IN RESPONSE TO TOUCH PRESSURE, AND METHOD THEREFOR

CROSS REFERENCE TO RELATED APPLICATIONS

This application is a National Phase Entry of PCT International Application No. PCT/KR2018/006082, which was filed on May 29, 2018, and claims a priority to Korean Patent Application No. 10-2017-0072340, which was filed on Jun. 9, 2017, the contents of which are incorporated herein by reference.

TECHNICAL FIELD

Embodiments of the disclosure relate to a technology for an electronic device and a method that perform a specified operation in response to a pressure of a touch.

BACKGROUND ART

As an electronic technology develops, various types of electronic devices such as a smartphone, a tablet personal computer (PC), a wearable device, and the like are being widely supplied.

DISCLOSURE

Technical Problem

A user may allow an electronic device to perform various operations through a plurality of touch inputs. However, in the case of controlling the electronic device only by using a simple touch input, a plurality of repeated inputs may be required for a specific function, and a user may feel uncomfortable. As such, nowadays, a pressure of a touch may be utilized as a new input means, but an operation capable of being implemented by a single pressure touch is very restrictive.

According to various embodiments of the disclosure, various operations that are intuitive may be implemented by utilizing a plurality of pressure touches.

Technical Solution

An electronic device according to an embodiment of the disclosure may include a memory, a display, a touch sensor that is included in the display or is coupled to the display and senses a touch, a pressure sensor that detects a pressure value of the touch, and a processor that is electrically connected with the memory, the display, the touch sensor, and the pressure sensor, and the processor may sense a first touch having a pressure value of a specified threshold value or greater at an area, on which the content is output, of an area of the display, by using the touch sensor and the pressure sensor, may store first location data of the first touch in the memory, may sense a second touch at the area on which the content is output, of an area of the display, by using the touch sensor and the pressure sensor, wherein the second touch has a pressure value of the specified threshold value or greater and is made after sensing the first touch, and may perform a specified operation of utilizing the first location data and second location data of the second touch as an input, in response to sensing the second touch.

Also, according to an embodiment of the disclosure, a method for performing an operation in response to a pressure of a touch may include sensing a first touch having a pressure value of a specified threshold value or greater; storing first location data of the first touch in a memory, sensing a second touch made after sensing the first touch and having a pressure value of the specified threshold value of greater, and performing a specified operation of utilizing the first location data and second location data of the second touch as an input, in response to sensing the second touch.

Advantageous Effects

According to embodiments of the disclosure, the user may implement various functions at an electronic device through a less number of manipulations. In implementing the functions, the user may require only a simpler, more intuitive manipulation, and thus, the user may use the functions more conveniently. Besides, a variety of effects directly or indirectly understood through this disclosure may be provided.

DESCRIPTION OF DRAWINGS

With regard to description of drawings, similar components may be marked by similar reference numerals.

MODE FOR INVENTION

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure.

Figure 1:
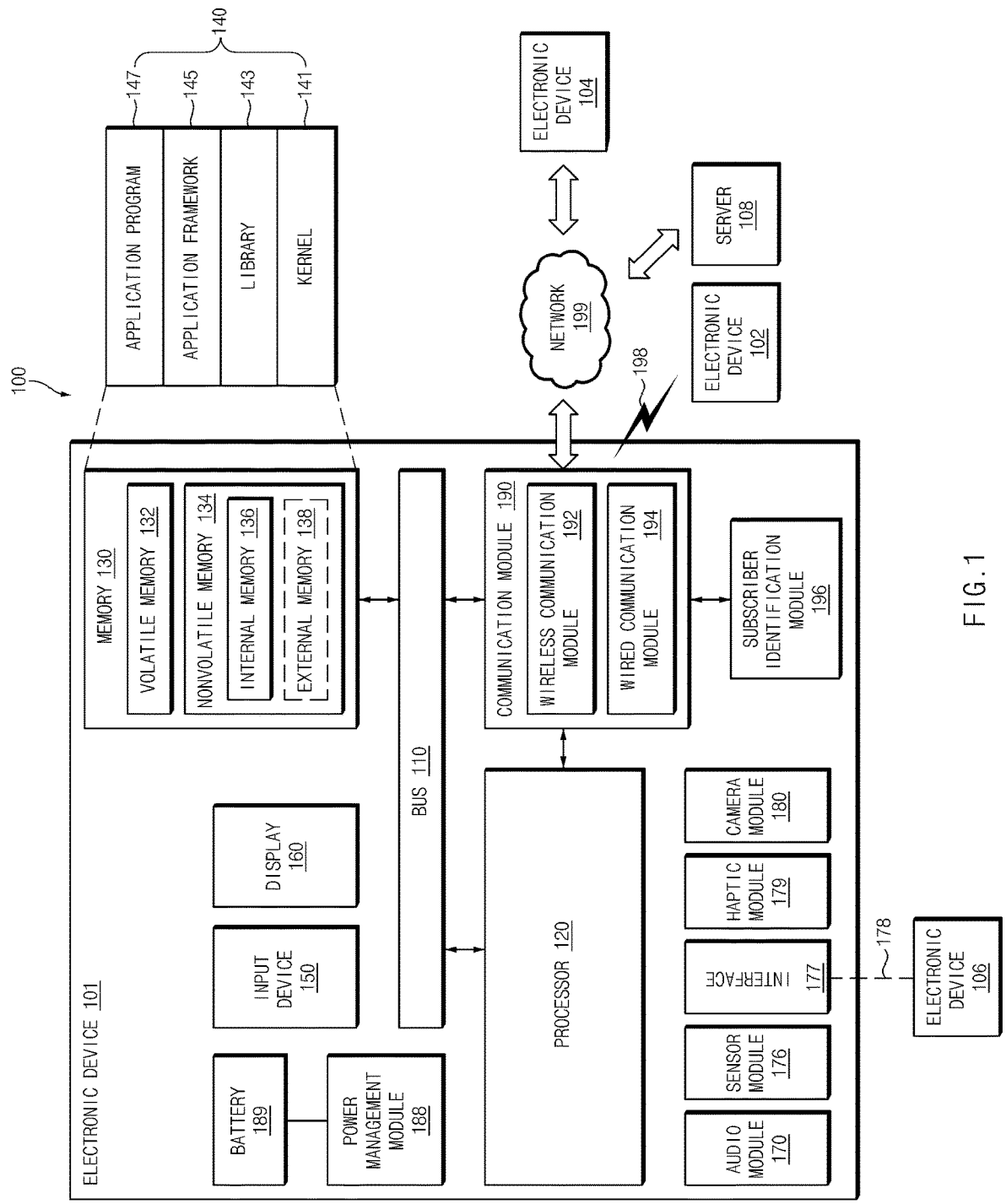
FIG. 1 illustrates a block diagram of an electronic device in a network environment according to various embodiments.

FIG. 1 illustrates a block diagram of an electronic device 101 in a network environment 100, according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

Referring to FIG. 1, under the network environment 100, the electronic device 101 (e.g., an electronic device 401) may communicate with an electronic device 102 through short-range wireless communication 198 or may communication with an electronic device 104 or a server 108 through a network 199. According to an embodiment, the electronic device 101 may communicate with the electronic device 104 through the server 108.

According to an embodiment, the electronic device 101 may include a bus 110, a processor 120 (e.g., a processor 480), a memory 130, an input device 150 (e.g., a microphone or a mouse), a display device 160, an audio module 170, a sensor module 176, an interface 177, a haptic module 179, a camera module 180, a power management module 188, a battery 189, a communication module 190, and a subscriber identification module 196. According to an embodiment, the electronic device 101 may not include at least one (e.g., the display device 160 or the camera module 180) of the above-described components or may further include other component(s).

The bus 110 may interconnect the above-described components 120 to 190 and may include a circuit for conveying signals (e.g., a control message or data) between the above-described components.

The processor 120 may include one or more of a central processing unit (CPU), an application processor (AP), a graphic processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application program to control at least one of another component (e.g., hardware or software component) of the electronic device 101 connected to the processor 120 and may process and compute various data. The processor 120 may load a command or data, which is received from at least one of other components (e.g., the communication module 190), into a volatile memory 132 to process the command or data and may store the result data into a nonvolatile memory 134.

The memory 130 may include, for example, the volatile memory 132 or the nonvolatile memory 134. The volatile memory 132 may include, for example, a random access memory (RAM) (e.g., a dynamic RAM (DRAM), a static RAM (SRAM), or a synchronous DRAM (SDRAM)). The nonvolatile memory 134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 134 may be configured in the form of an internal memory 136 or the form of an external memory 138 which is available through connection only if necessary, according to the connection with the electronic device 101. The external memory 138 may further include a flash drive such as compact flash (CF), secure digital (SD), micro secure digital (Micro-SD), mini secure digital (Mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software component, such as a command or data associated with the program 140, of the electronic device 101. The program 140 may include, for example, a kernel 141, a library 143, an application framework 145 or an application program (interchangeably, "application") 147.

The input device 150 may include a microphone, a mouse, or a keyboard. According to an embodiment, the keyboard may include a keyboard physically connected or a virtual keyboard displayed through the display device 160.

The display device 160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (not illustrated) (e.g., a speaker or a receiver) included in the electronic device 101, an external electronic device (e.g., the electronic device 102 (e.g., a wireless speaker or a wireless headphone)) or an electronic device 106 (e.g., a wired speaker or a wired headphone) connected with the electronic device 101

The sensor module 176 may measure or detect, for example, an internal operating state (e.g., power or temperature) of the electronic device 101 or an external environment state (e.g., an altitude, a humidity, or brightness) to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 176 may further include a control circuit for controlling at least one or more sensors included therein. According to an embodiment, the electronic device 101 may control the sensor module 176 by using the processor 120 or a processor (e.g., a sensor hub) separate from the processor 120. In the case that the separate processor (e.g., a sensor hub) is used, while the processor 120 is in a sleep state, the separate processor may operate without awakening the processor 120 to control at least a portion of the operation or the state of the sensor module 176.

According to an embodiment, the interface 177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 178 may physically connect the electronic device 101 and the electronic device 106. According to an embodiment, the connector 178 may include, for example, an USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which is to manage the power of the electronic device 101, may constitute at least a portion of a power management integrated circuit (PMIC).

The battery 189 may include a primary cell, a secondary cell, or a fuel cell and may be recharged by an external power source to supply power at least one component of the electronic device 101.

The communication module 190 may establish a communication channel between the electronic device 101 and an external device (e.g., the first external electronic device 102, the second external electronic device 104, or the server 108). The communication module 190 may support wired communication or wireless communication through the established communication channel. According to an embodiment, the communication module 190 may include a wireless communication module 192 or a wired communication module 194. The communication module 190 may communicate with the external device through a first network 198 (e.g. a short range communication network such as Bluetooth or infrared data association (IrDA)) or a second network 199 (e.g., a wireless wide area network such as a cellular network) through a relevant module among the wireless communication module 192 or the wired communication module 194.

The wireless communication module 192 may support, for example, cellular communication, short-range wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UNITS), Wireless Broadband (WiBro), or Global System for Mobile Communications (GSM). The short-range wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 192 supports cellar communication, the wireless communication module 192 may, for example, identify or authenticate the electronic device 101 within a communication network using the subscriber identification module (e.g., a SIM card) 196. According to an embodiment, the wireless communication module 192 may include a communication processor (CP) separate from the processor 120 (e.g., an application processor (AP)). In this case, the communication processor may perform at least a portion of functions associated with at least one of components 110 to 196 of the electronic device 101 in substitute for the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, short-range wireless communication, or a GNSS communication.

The wired communication module 194 may include, for example, a local area network (LAN) service, a power line communication, or a plain old telephone service (POTS).

For example, the first network 198 may employ, for example, Wi-Fi direct or Bluetooth for transmitting or receiving commands or data through wireless direct connection between the electronic device 101 and the first external electronic device 102. The second network 199 may include a telecommunication network (e.g., a computer network such as a LAN or a WAN, the Internet or a telephone network) for transmitting or receiving commands or data between the electronic device 101 and the second electronic device 104.

According to various embodiments, the commands or the data may be transmitted or received between the electronic device 101 and the second external electronic device 104 through the server 108 connected with the second network 199. Each of the first and second external electronic devices 102 and 104 may be a device of which the type is different from or the same as that of the electronic device 101. According to various embodiments, all or a part of operations that the electronic device 101 will perform may be executed by another or a plurality of electronic devices (e.g., the electronic devices 102 and 104 or the server 108). According to an embodiment, in the case that the electronic device 101 executes any function or service automatically or in response to a request, the electronic device 101 may not perform the function or the service internally, but may alternatively or additionally transmit requests for at least a part of a function associated with the electronic device 101 to any other device (e.g., the electronic device 102 or 104 or the server 108). The other electronic device (e.g., the electronic device 102 or 104 or the server 108) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
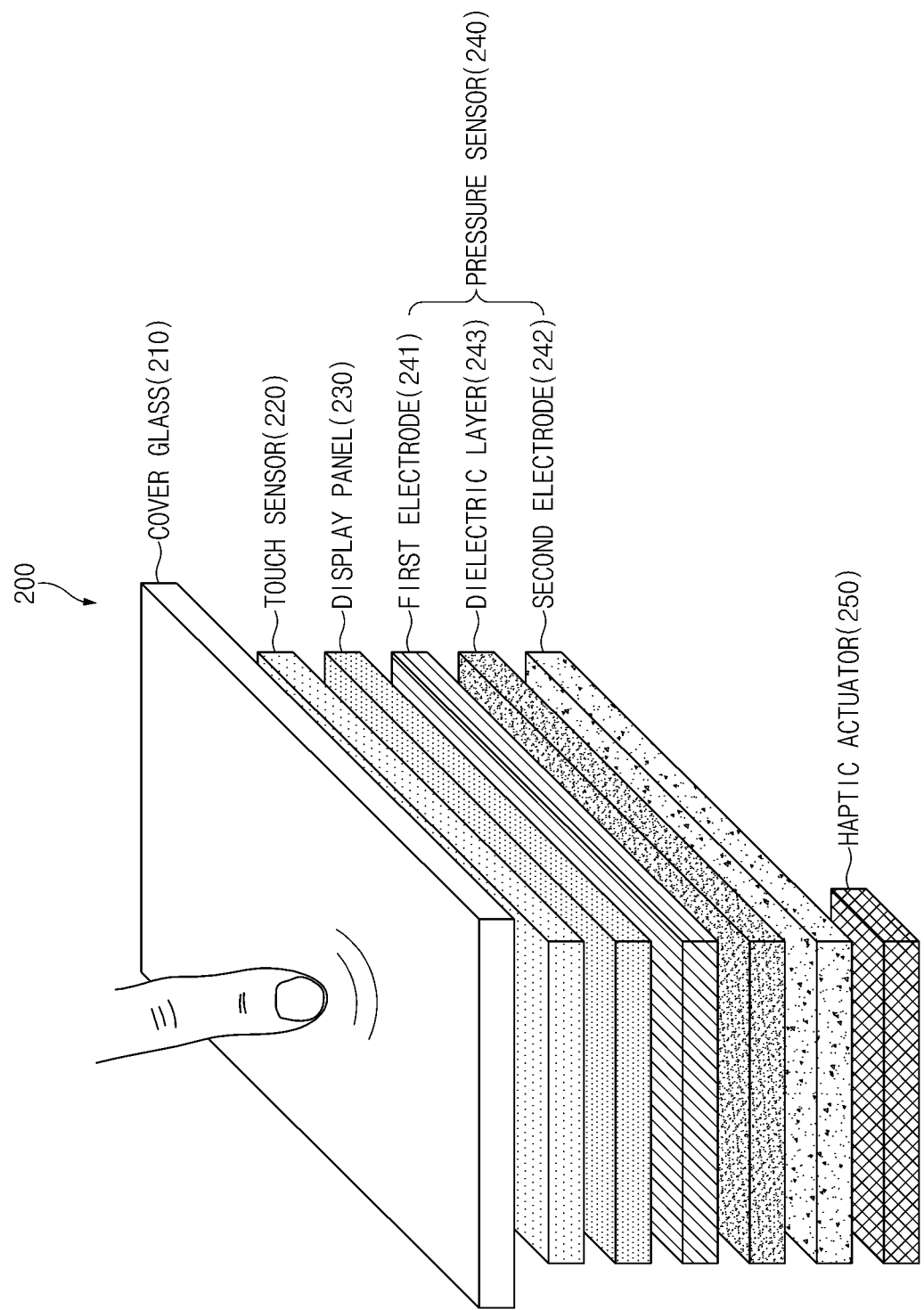
FIG. 2 illustrates a stacked structure of a display, according to an embodiment.

FIG. 2 illustrates a stacked structure of a display, according to an embodiment.

Referring to FIG. 2, a stacked structure of a display according to an embodiment is illustrated. A display 200 may correspond to the display device 160 illustrated in FIG. 1.

In the stacked structure of the display according to an embodiment, a cover glass 210 may transmit a light generated by a display panel 230. A user may perform a "touch" (including a contact using an electronic pen) on the cover glass 210 by touching a portion (e.g., a finger) of his/her body on the cover glass 210. The cover glass 210 may be formed of, for example, tempered glass, reinforced plastic, a flexible polymer material, or the like and may protect a display or an electronic device equipped with the display from an external impact. According to various embodiments, the cover glass 210 may be also referred to as a "glass window" or "cover window".

In a touch sensor 220, a specified physical quantity (e.g., a voltage, a light quantity, a resistance, the amount of charges, a capacitance, or the like) may change due to a contact of an external object (e.g., a finger of the user or an electronic pen). The touch sensor 220 may detect at least one location of a touch on the display (e.g., on a surface of the cover glass 210) by the external object based on the change in the specified physical quantity. For example, the touch sensor 220 may include, for example, a capacitive touch sensor, a resistive touch sensor, an infrared touch sensor, a piezo touch sensor, or the like. According to various embodiments, the touch sensor 220 may be referred to as various names, such as a touch panel and the like, based on the implementation form.

The display panel 230 may output at least one content or item (e.g., a text, an image, a video, an icon, a widget, a symbol, or the like). For example, the display panel 230 may include a liquid crystal display (LCD) panel, a light-emitting diode (LED) display panel, an organic LED (OLED) display panel, a microelectromechanical systems (MEMS) display panel, or an electronic paper display panel.

According to various embodiments of the disclosure, the display panel 230 may be integrally implemented with the touch sensor (or touch panel) 220. In this case, the display panel 230 may be also referred to as a touch screen panel (TSP) or a touch screen display panel.

A pressure sensor 240 may detect a pressure (or force) by an external object (e.g., a finger of the user or an electronic pen) against a display (e.g., a surface of the cover glass 210). According to an embodiment, the pressure sensor 240 may include a first electrode 241, a second electrode 242, and/or a dielectric layer 243. For example, the pressure sensor 240 may sense the pressure of the touch based on a capacitance between the first electrode 241 and the second electrode 242, which changes depending on the pressure of the touch. A configuration of the pressure sensor 240 will be more fully described with reference to FIG. 3.

When a touch (including a hovering and a "force touch") is input by an external object (e.g., a finger of the user or an electronic pen), a haptic actuator 250 may provide the user with a haptic feedback (e.g., vibration). To this end, the haptic actuator 260 may include a piezoelectric member and/or a vibration plate.

The stacked structure of the display above of FIG. 2 is an example and is able to be variously changed or modified. For example, the touch sensor 220 may be formed directly on a back surface of the cover glass 210 (a so-called cover glass integrated touch panel), may be inserted between the cover glass 210 and the display panel 230 after being separately manufactured (a so-called add-on touch panel), may be formed directly on the display panel 230 (a so-called on-cell touch panel), or may be included within the display panel 230 (a so-called in-cell touch panel). Also, according to various embodiments, an area-type fingerprint sensor that is implemented to be transparent or opaque may be additionally included in the stacked structure.

Figure 3:
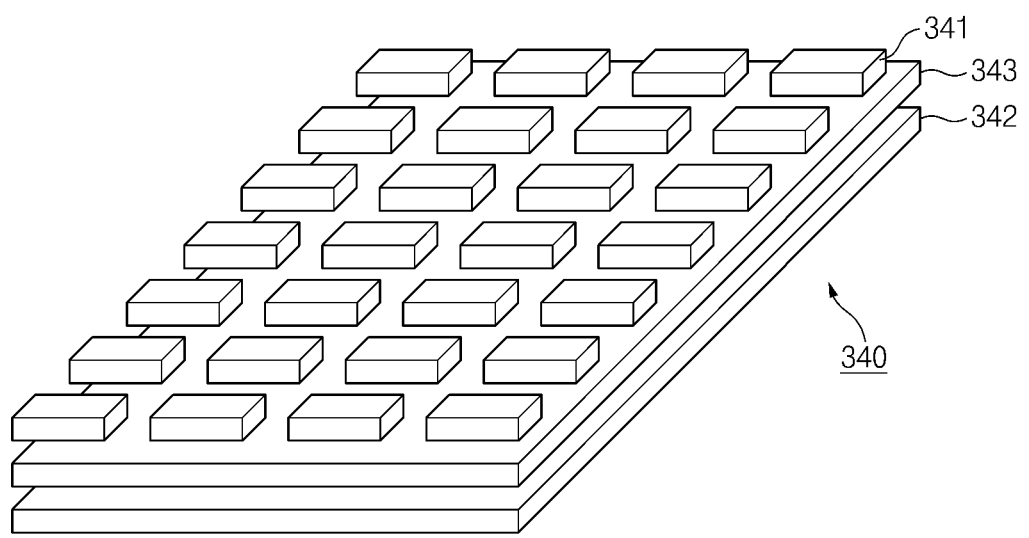
FIG. 3 illustrates a pressure sensor, according to an embodiment.

FIG. 3 illustrates a pressure sensor, according to an embodiment.

Referring to FIG. 3, a pressure sensor 340 according to an embodiment may include a first electrode 341, a second electrode 342, and a dielectric layer 343. For example, the pressure sensor 340 may correspond to the pressure sensor 240 illustrated in FIG. 2. However, a configuration of the pressure sensor 240 is not limited to an example illustrated in FIG. 3.

According to an embodiment, the first electrode 341 and/or the second electrode 342 may be implemented to be transparent or opaque. For example, with implemented to be opaque, a conductive member (e.g., a conductive patch or a conductive wire) of the first electrode 341 and/or the second electrode 342 may be formed of copper (Cu), silver (Ag), magnesium (Mg), titanium (Ti), or opaque graphene. Also, in the case where implemented to be transparent, the first electrode 341 and/or the second electrode 342 may be formed of indium thin oxide (ITO), indium zinc oxide (IZO), Ag nanowire, metal mesh, transparent conducting polymer, or transparent graphene.

According to an embodiment, one of the first electrode 341 and/or the second electrode 342 may be implemented with one metal plate that functions as ground (GND), and the other thereof may be formed of a repeated polygon pattern by using the above-described material. The first electrodes 341 are illustrated in FIG. 3 as being implemented with square conductive patches arranged in an array pattern, but the disclosure is not limited thereto.

For another example, one (e.g., a transmitting terminal Tx) of the first electrode 341 and the second electrode 342 may be formed of a pattern extended in a first direction, and the other (e.g., a receiving terminal Rx) thereof may be formed of a pattern extended in a second direction intersecting the first direction at a specified angle (e.g., a right angle) (a so-called mutual-capacitance manner). According to various embodiments, the first electrode 341 and/or the second electrode 342 may be implemented with a conductive wire that is bent in the form of a strain gage pattern. For example, the first electrode 341 may be formed directly on a back surface of a display panel (e.g., 230 of FIG. 2). Alternatively, the first electrode 341 may be printed on a flexible printed circuit board (FPCB), and the FPCB may be attached to one surface of the panel.

The dielectric layer 343 may be formed of a dielectric material having a specified capacitance, for example, silicon foam, silicon membrane, optical clean adhesive (OCA), sponge, rubber, or polymer (e.g., polycabonate (PC), polyethylene terephthalate (PET), or the like).

Figure 4:
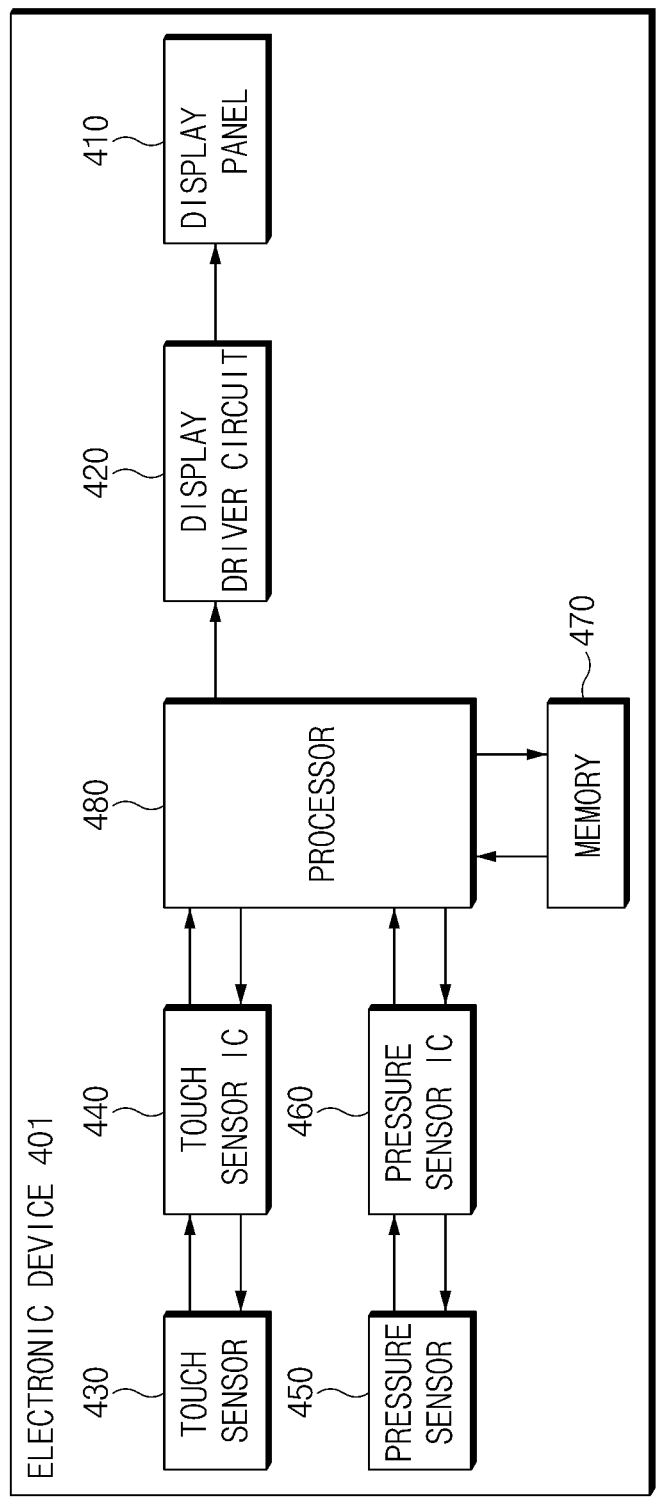
FIG. 4 illustrates a hardware block diagram of an electronic device, according to an embodiment.

FIG. 4 illustrates a hardware block diagram of an electronic device, according to an embodiment.

Referring to FIG. 4, the electronic device 401 according to an embodiment may include a display panel 410, a display driver circuit 420, a touch sensor 430, a touch sensor IC 440, a pressure sensor 450, a pressure sensor IC 460, a memory 470, and the processor 480.

The display panel 410 may receive an image driving signal transmitted from the display driver circuit 420. For example, the display panel 410 may display a variety of content (e.g., a text, an image, a video, an icon, a GUI, a symbol, or the like) based on the image signal. In the specification, the expression "an output to a display" may be understood as the same meaning as "an output to a display panel".

The display driver circuit 420 may receive image data from the processor 480 and may output the image data to the display panel 410. For example, the display driver circuit 420 may supply the display panel 410 with an image signal corresponding to image data received from the processor 480 at a previously determined frame rate.

The touch sensor 430 may sense a touch of the user in the whole output area of the display. In various embodiments, the touch of the user may include a direct touch or a proximity touch (e.g., a hovering). In various embodiments, the direct touch may be made by the user or various tools (e.g., an electronic pen). In the touch sensor 430, a specified physical quantity (e.g., a voltage, a light quantity, a resistance, the amount of charges, a capacitance, or the like) may vary when the touch of the user is made. The touch sensor IC 440 may sense the variation in the physical quantity and may calculate location data of the touch.

The touch sensor IC 440 may be electrically connected with the touch sensor 430 and may calculate location data (e.g., coordinates (X, Y) of the location at which the touch is made) associated with the touch based on the variation in the physical quantity detected from the touch sensor 430. In an embodiment, the touch sensor IC 440 may include a buffer or a memory and may store the calculated location data in the buffer or the memory. The processor 480 may read the location data written in the buffer or the memory in response to an interrupt generated from the touch sensor IC 440.

The pressure sensor 450 may sense an external pressure (or force) from the whole area or a partial area of the display. For example, the pressure sensor 450 may sense the pressure applied on the display by the finger of the user. According to an embodiment, when a touch of the user is made, a specified physical quantity (e.g., a capacitance between electrodes of the pressure sensor 450, the amount of current induced at an inductor forming the pressure sensor 450, a resistance of a conductor forming the pressure sensor 450, a current or voltage difference due to a piezo material forming the pressure sensor 450, or the like) may vary in the pressure sensor 450 due to the touch. The pressure sensor IC 460 may sense the variation in the physical quantity and may calculate a pressure value of the touch.

The pressure sensor IC 460 may be electrically connected with the pressure sensor 450 and may calculate a pressure value associated with the touch based on the variation in the physical quantity detected from the pressure sensor 450. In an embodiment, the pressure sensor IC 460 may include a buffer or a memory and may store the calculated pressure value in the buffer or the memory. The processor 480 may read the pressure value written in the buffer or the memory in response to an interrupt generated from the pressure sensor IC 460.

The memory 470 may be electrically connected with the processor 480 and may store commands or data associated with operations of components included in the electronic device 401. According to various embodiments, the memory 470 may store data (e.g., location data and/or a pressure value) on a touch of the user, an algorithm for an operation corresponding to the touch, an instruction for the operation, or the like.

The processor 480 may be electrically connected with the components included in the electronic device 401 and may process an operation or data processing associated with a control and/or communication of the components included in the electronic device 401.

According to an embodiment, when a touch is made, the processor 480 may receive location data of the touch from the touch sensor IC 440 and may receive a pressure value of the touch from the pressure sensor IC 460. The received location data and/or pressure value may be stored in the memory 470.

According to an embodiment, the processor 480 may determine whether a magnitude of the pressure value is a specified threshold value or greater. When the determination result indicates that the magnitude of the pressure value is the specified threshold value or greater, the processor 480 may recognize the touch as a pressure touch (or a forced touch). In the specification, a first touch and a second touch may correspond to the pressure touch.

According to an embodiment, an operation corresponding to a single pressure touch may be set in the electronic device 401. In this case, when a pressure touch is sensed, the processor 480 may output, to the display panel 410, a graphic user interface (GUI) (e.g., a pop-up window) that is implemented to select an operation corresponding to the pressure touch. The operation corresponding to the single pressure touch may include a plurality of operations. In an embodiment, when one of the plurality of operations is selected through the GUI, the processor 480 may perform the selected operation and may terminate the processing associated with the pressure touch.

According to an embodiment, at least one content may be output to the display panel 410, and the single pressure touch may be made on an area where the content is output. In an embodiment, in the case where the operation corresponding to the single pressure touch is not set or the operation is not selected through the GUI (e.g., in the case of touching a previous key), the processor 480 may recognize the pressure touch as the first touch according to an embodiment of the disclosure.

In an embodiment, when the pressure touch is recognized as the first touch, the processor 480 may store first location data of the first touch and/or a first pressure value of the first touch, which is calculated at the touch sensor IC 440 and/or the pressure sensor IC 460, in the memory 470 and may wait for an input of the second touch. According to an embodiment, after the first touch is sensed, the processor 480 may obtain location data and/or a pressure value of a succeeding touch by using the touch sensor 430 and the pressure sensor 450.

In an embodiment, the processor 480 may recognize a pressure touch sensed after the sensing of the first touch as the second touch according to an embodiment of the disclosure. In an embodiment, the first touch and the second touch may correspond to a pressure touch that is made on an area where the same content is output.

According to an embodiment, when the second touch following the first touch is recognized, the processor 480 may perform a specified operation that utilizes first location data of the first touch and second location data of the second touch as an input. For example, the processor 480 may perform the specified operation associated with the area that is defined by the first location data and the second location data. In another embodiment, the specified operation may be performed in a background in response to sensing the first touch, or may be performed in a foreground in response to sensing the second touch.

According to an embodiment, the specified operation may utilize data of the content corresponding to the first location data as a first input and may utilize data of the content corresponding to the second location data as a second input. For example, in the case where geographical objects (e.g., Hannam station and Gangnam station) on a map are being output at a location, which the first location data and the second location data indicate, of an output area of a display, the specified operation may correspond to an operation of searching for an optimum path between the geographical objects by using geographical locations respectively linked to the geographical objects as a first input and a second input.

In an embodiment, after the first touch is sensed, a third touch (e.g., a tap or a touch move) having a pressure value smaller than the specified threshold value may be made. In an embodiment, when the third touch is made, the processor 480 may perform an operation corresponding to the third touch. For example, the third touch may correspond to an operation of tapping a specific object with a pressure value smaller than the specified threshold value. The processor 480 may perform an operation of selecting the specific object in response to sensing the third touch. According to an embodiment, the operation corresponding to the third touch may be performed independently of a specified operation of utilizing the first location data and the second location data as an input.

According to an embodiment, the specified operation may change to correspond to a type of content output at a location where the first touch is made. In an embodiment, when the first touch is made, the processor 480 may analyze the type of the content output at the location where the first touch is made. According to an embodiment, various operations according to the type of the content may be stored in the memory 470, and the processor may determine one specified operation based on the analysis result. For example, the specified operation may change based on a type corresponding to the content from among a text, an image, and a video.

According to an embodiment, when the first touch is recognized and a specified operation is determined based on the type of the content, the specified operation may be performed in a background until the second touch is recognized. The specified operation may be performed separately from (or independently of) an application currently executed in a foreground or an operation currently performed in a foreground. In an embodiment, the specified operation may utilize the first location data of the first touch as a first input.

According to an embodiment, when the second touch following the first touch is recognized, the processor 480 may perform a specified operation, which is being performed in the background, in a foreground. In an embodiment, the second location data of the second touch may be utilized as a second input of the specified operation.

For example, a type of content output at a location where the first touch is made may correspond to an image. For example, in the case where the first touch is made on an image output by an image viewer application, for example, the specified operation may correspond to an operation of capturing a specific area of the image, an operation of selecting the specific area of the image, an operation of enlarging the specific area of the image to the whole area of the display, or the like.

In an embodiment, when the specified operation corresponds to the operation of capturing the specific area of the image, a capture application may be executed for the operation. The capture application may perform an operation of capturing a specific area of a screen and storing the captured result of the specific area in the memory 470.

According to an embodiment, after the first touch is recognized and until the second touch is recognized, the capture application may be executed in a background separately from the execution of the image viewer application. The first location data of the first touch may be utilized as a first input of the capture application. Afterwards, when the second touch is recognized, the processor 480 may execute the capture application in a foreground and may utilize the second location data of the second touch as a second input of the capture application.

In an embodiment, the processor 480 may capture an image of an area specified by the first location data and the second location data. The specified area may have, for example, a quadrangular shape. In this case, the first location data and the second location data may correspond to vertexes of the quadrangle, which do not be adjacent to each other.

For another example, a type of content output at a location where the first touch is made may correspond to a text. In an embodiment, a specified operation corresponding to the case where the type of the content corresponds to a text may be, for example, an operation of selecting a specific area of the text.

In an embodiment, after the first touch is recognized and until the second touch is recognized, the operation of selecting the text may be performed in a background separately from an operation of outputting the text to the display. First location data of the first touch may be utilized as a first input of the operation of selecting the text. Afterwards, when the second touch is recognized, the processor 480 may utilize second location data of the second touch as a second input of the operation of selecting the text and may perform the operation in a foreground. As the operation is performed in a foreground, the processor 480 may display a text of the selected specific area on a screen. In an embodiment, the processor 480 may select the text from a character corresponding to the first location data to a character corresponding to the second location data.

According to an embodiment, the specified operation may change to correspond to an application that is being executed at a location where the first touch is made. In an embodiment, when the first touch is recognized, the processor 480 may verify the application that is being executed at the location where the first touch is made. According to an embodiment, various operations according to the application may be stored in the memory 470, and the specified operation may be determined based on the verified application. For example, the specified operation may change based on a type corresponding to an application of a map-related application (e.g., a map application, a subway map application, a navigation application, or the like), an application to play a sound source, and a message application.

According to an embodiment, the application that is being executed at the location where the first touch is made may correspond to a map-related application, for example, a map application. In an embodiment, a specified operation corresponding to a map application may correspond, for example, an operation of searching for an optimum path.

In an embodiment, the first location data of the first touch and the second location data of the second touch may be utilized as an input of the operation of searching for an optimum path. For example, the processor 480 may utilize a geographical location corresponding to the first location data as a first input and a geographical location corresponding to the second location data as a second input. The processor 480 may perform an operation of searching for an optimum path between the geographical location corresponding to the first location data and the geographical location corresponding to the second location data.

According to an embodiment, the application that is being executed at the location where the first touch is made may correspond to an application of playing a sound source. In an embodiment, a specified operation corresponding to the sound source player application may correspond to, for example, an operation of repeatedly playing a sound source list of a specified range or an operation of repeatedly playing a specific interval of the sound source.

In an embodiment, when the specified operation is the operation of repeatedly playing the sound source list of the specified range, the first location data of the first touch and the second location data of the second touch may be utilized as an input of the operation. For example, the processor 480 may utilize an object (e.g., an object of a first sound source) corresponding to the first location data as a first input and an object (e.g., an object of a second sound source) corresponding to the second location data as a second input. The processor 480 may perform an operation of repeatedly playing a sound source list between the first sound source corresponding to the first object and the second sound source corresponding to the second object.

In another embodiment, when the specified operation is the operation of repeatedly playing the specific interval of the sound source, a first play start point corresponding to the first location data and a second play start point corresponding to the second location data may be present in the sound source. The processor 480 may perform the operation of repeatedly playing the sound source between the first point and the second point.

According to an embodiment, a specified operation may change based on an application that is being executed at a location or a time at which the first touch is made and an application that is being executed at a location or a time at which the second touch is made. According to an embodiment, in the case where the first touch and the second touch are made on areas where different applications are executed, the processor 480 may analyze types of the applications and may determine a specified operation that is mutually linked between the applications. For example, the first touch may be made on an area where a map application is executed, and the second touch may be made on an area where a search input window location of a web browser application. In this case, the processor 480 may determine an operation, which is able to be mutually linked between the applications, as the specified operation. For example, the processor 480 may determine, as the specified operation, an operation of searching for a geographical location corresponding to the first location data of the first touch in the web browser application where the second touch is made.

According to an embodiment, in the case of failing to determine a specified operation capable of being mutually linked between the applications, the processor 480 may simultaneously output execution screens of the applications to the display panel 410 by a multi window function. In an embodiment, the multi window function may correspond to a function in which the processor 480 partitions a screen output area of the display panel 410 and outputs a plurality of applications.

According to an embodiment, a specified operation may include a plurality of operations. In an embodiment, when the second touch is made after the first touch, the processor 480 may output, to the display panel 410, a graphic user interface (GUI) that is implemented to select one of the plurality of operations. For example, in the case where the first touch and the second touch are made on an execution screen of a map application, the specified operation may include an operation such as an optimum path searching operation or a run-time calculating operation. In this case, the processor 480 may output, to the display panel 410, the GUI implemented to select one of the plurality of operations.

According to an embodiment, an additional operation that is linked with a specified operation of utilizing the first touch and the second touch as an input may exist. For example, in the case where the specified operation is the operation of selecting a text from a character corresponding to a location where the first touch is made to a character corresponding to a location where the second touch is made, a linked operation such as an operation of copying or sharing the selected text or searching a web for the selected text may be additionally performed. In an embodiment, in the case where the linked additional operation includes a plurality of operations, the processor 480 may output, to a display, a GUI implemented to select one of the linked additional operations.

In an embodiment, the processor 480 may recognize only a touch made within a specified area of the display panel 410 as the first touch and the second touch according to an embodiment of the disclosure. An area corresponding to a system key (e.g., a home key, a menu key, a previous key, or the like) may be present in the area of the display panel 410, and the remaining area of the area of the display panel 410 other than the area corresponding to the system key may correspond to an application execution area. In an embodiment, the specified area may correspond to the application execution area. In the case where a pressure touch is made outside the specified area (e.g., in a system key area), the processor 480 may perform an operation (e.g., home screen move) corresponding to the pressure touch.

Figure 5:
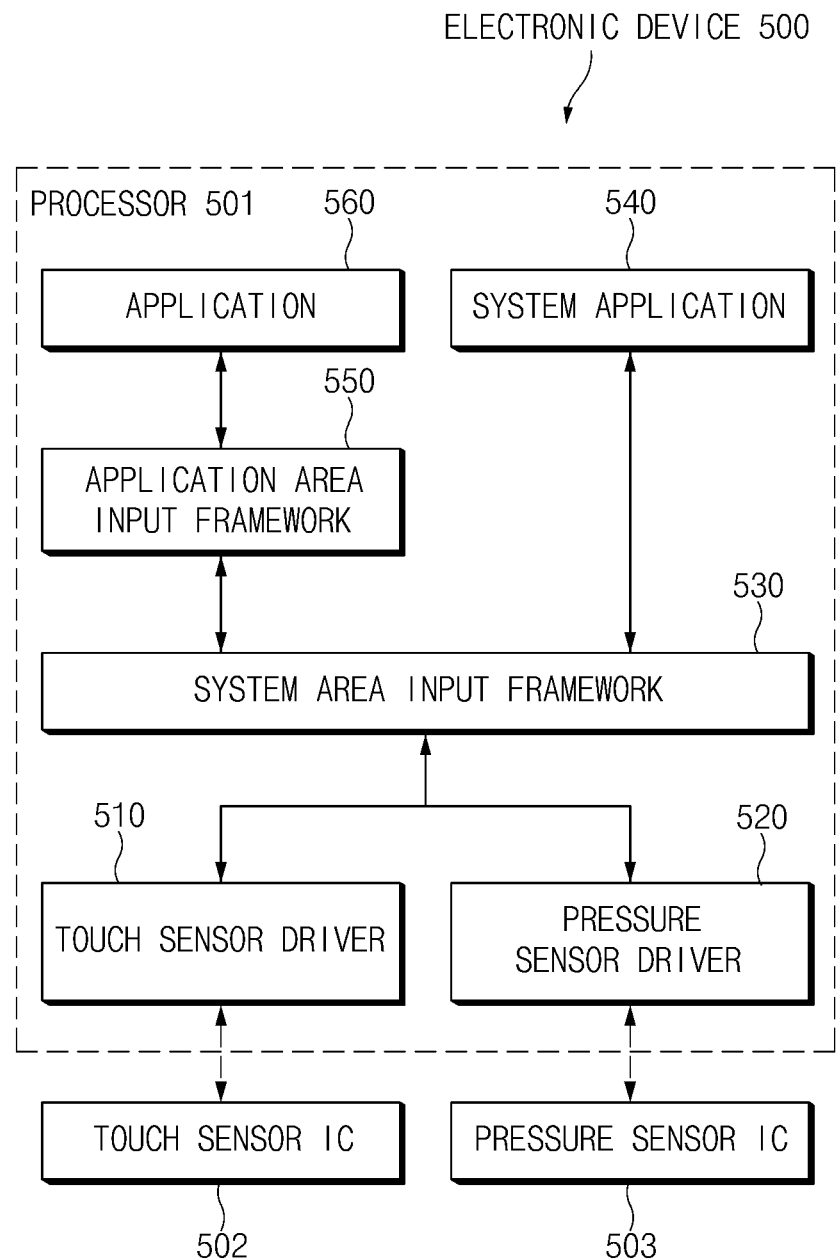
FIG. 5 illustrates a software block diagram of an electronic device, according to an embodiment.

FIG. 5 illustrates a software block diagram of an electronic device, according to an embodiment.

Referring to FIG. 5, an electronic device 500 may include a processor 501, a touch sensor IC 502, and a pressure sensor IC 503. The processor 501, the touch sensor IC 502, and the pressure sensor IC 503 may correspond to the processor 480, the touch sensor IC 440, and the pressure sensor IC 460 illustrated in FIG. 4, respectively.

A touch sensor driver 510, a pressure sensor driver 520, a system area input framework 530, a system application 540, an application area input framework 550, and an application 560 that are an instruction set or code stored in a memory (e.g., the memory 470) may correspond to software modules executable by an operation of the processor 501. Accordingly, operations of the software modules 510, 520, 530, 540, 550, and 560 to be described below may be understood as an operation of the processor 501.

According to an embodiment, when a touch of the user is sensed, the touch sensor IC 502 may generate an interrupt that notifies the touch sensor driver 510 that the touch is sensed. The touch sensor driver 510 may read location data of the touch from the touch sensor IC 502 in response to the interrupt. According to an embodiment, the location data may be transmitted from the touch sensor driver 510 to the system area input framework 530.

According to an embodiment, when a touch of the user is sensed, the pressure sensor IC 503 may generate an interrupt that notifies the pressure sensor driver 520 that a pressure value of the touch is detected. The pressure sensor driver 520 may read the pressure value of the touch from the pressure sensor IC 503 in response to the interrupt. According to an embodiment, the pressure value may be transmitted from the pressure sensor driver 520 to the system area input framework 530.

According to an embodiment, the location data and the pressure value may be synchronized as a value generated by the same touch. According to an embodiment, the processor 501 may read the location data and the pressure value in response to one of the interrupts generated from the touch sensor IC 502 or the pressure sensor IC 503. For example, the processor 501 may ignore an interrupt signal generated from the pressure sensor IC 503 and may read the location data and the pressure value in response to an interrupt signal generated from the touch sensor IC 502.

According to an embodiment, in response to receiving the interrupt, it may be possible to cause the touch sensor driver 510 to read the location data from the touch sensor IC 502 and, simultaneously, the pressure sensor driver 520 to read the pressure value from the pressure sensor IC 503. Through the process, the processor 501 may obtain the location data and the pressure value at the same time point and may synchronize the location data and the pressure value as a value of the same touch.

According to an embodiment, the processor 501 may constitute data that the location data and the pressure value thus synchronized are combined. For example, the pressure sensor driver 520 may transmit the pressure value to the touch sensor driver 510, and the touch sensor driver 510 may combine the location data and the pressure value to one data. In an embodiment, the combined data may be transmitted to the system area input framework 530.

The system area input framework 530 may process a touch sensed at an area, which corresponds to a system key (e.g., a home key, a menu key, a previous key, or the like), of a display area. According to an embodiment, data on a screen layout of the system key may be provided to the system area input framework 530. According to an embodiment, the screen layout of the system key may be reduced or enlarged depending on an executed application. In an embodiment, some functions of system keys may be enabled or disabled, and some system keys may be added or deleted.

According to an embodiment, the system area input framework 530 may compare location data and a pressure value transmitted from the touch sensor driver 510 and/or the pressure sensor driver 520 with data on the screen layout of the system key.

According to an embodiment, in the case where the location data and the pressure value correspond to the screen layout of the system key, the system area input framework 530 may recognize that the touch is sensed in an area corresponding to a system key.

In an embodiment, the system area input framework 530 may determine whether the touch coincides with a condition for an operation of a system key, based on the location data and/or the pressure value. When the touch coincides with the condition, the system area input framework 530 may determine an operation corresponding to the touch and may transmit data on the determined operation to the system application 540. In an embodiment, the system application 540 may perform the determined operation in response to receiving the data, and the processor 501 may terminate the processing associated with the location data and the pressure value.

According to an embodiment, in the case where the location data and the pressure value do not correspond to the screen layout of the system key, the processor 501 may determine that the touch is sensed at an application execution area, not the area corresponding to the system key. The system area input framework 530 may transmit the location data and the pressure value to the application area input framework 550.

The application area input framework 550 may process the touch sensed at the application execution area, which is not the area corresponding to the system key, of the display area.

In an embodiment, the application area input framework 550 may determine whether the touch coincides with a condition for a specified operation, based on the location data and/or the pressure value. For example, the application area input framework 550 may determine whether the pressure value of the touch is a specified threshold value or greater. When the touch coincides with the condition, the application area input framework 550 may determine an operation corresponding to the touch and may transmit data on the determined operation to the application 560.

In an embodiment, the application 560 may perform the determined operation in response to receiving the data on the determined operation, and the processor 501 may terminate the processing associated with the location data and the pressure value. For example, in the case where the touch corresponds to the first touch, the processor 501 may store first location data of the first touch in the memory and may perform a specified operation of utilizing the first location data as a first input in a background.

Figure 6:
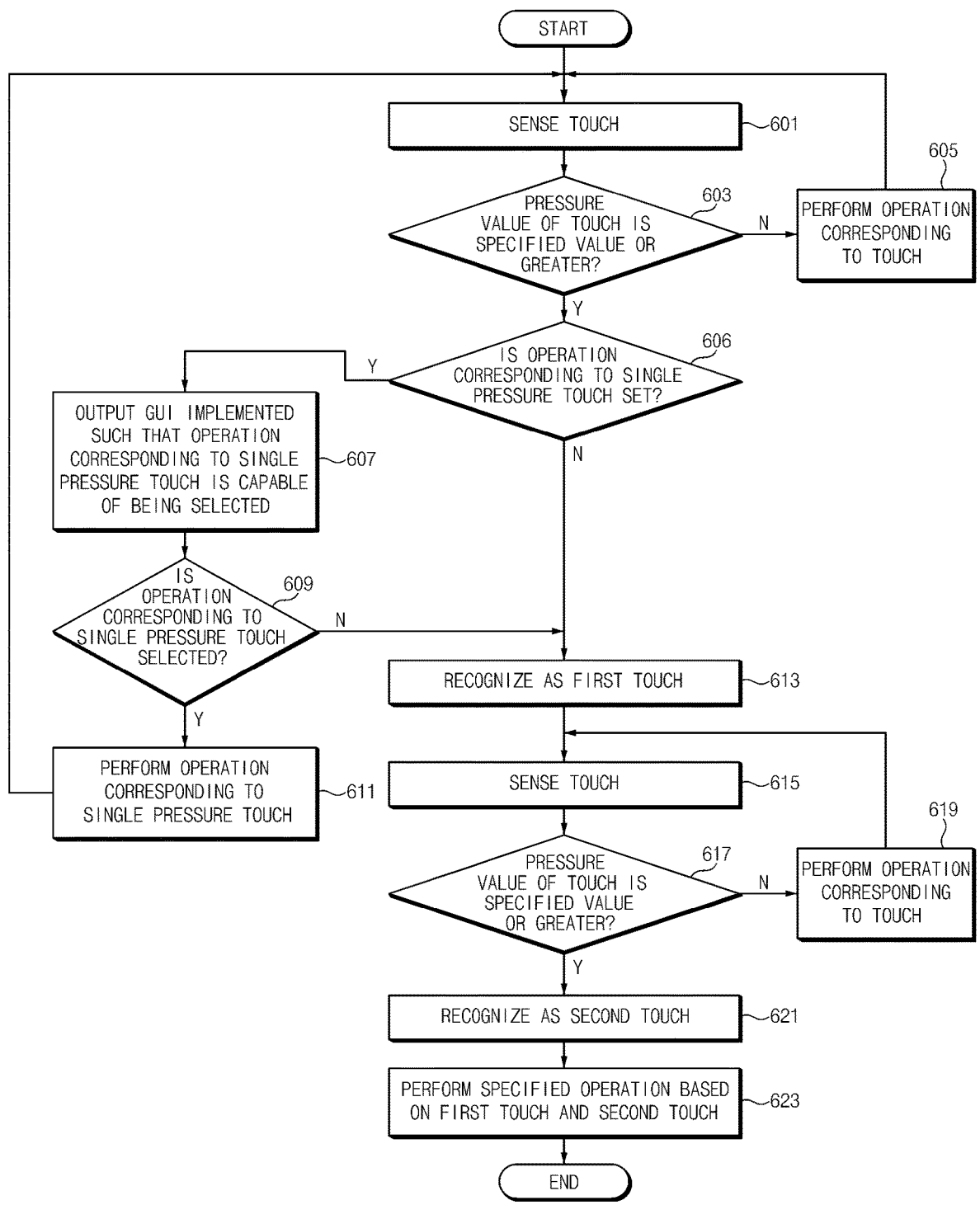
FIG. 6 illustrates a flowchart in which an electronic device performs a specified operation by utilizing a plurality of touches, according to an embodiment.

FIG. 6 illustrates a flowchart in which an electronic device performs a specified operation by utilizing a plurality of touches, according to an embodiment.

Referring to FIG. 6, according to an embodiment, a method for performing a specified operation by utilizing a plurality of touches may include operation 601 to operation 623. Operation 601 to operation 623 may be performed by, for example, the processor 480 illustrated in FIG. 4.

In operation 601, an electronic device according to an embodiment may sense a touch. The touch may include a direct touch by the user or an indirect touch by various tools (e.g., an electronic pen).

In operation 603, the electronic device according to an embodiment may determine whether a pressure value of the touch is a specified threshold value or greater. Depending on the determination result, the electronic device may determine whether the touch corresponds to a pressure touch. When the pressure value is smaller than the specified threshold value, the touch may not correspond to a pressure touch, and the electronic device may perform operation 605. When the pressure value is the specified threshold value or greater, the touch may correspond to a pressure touch, and the electronic device may perform operation 606.

In operation 605, because the touch is not recognized as a pressure touch, the electronic device according to an embodiment may recognize the touch as an independent, single touch and may perform an operation corresponding to the touch. In the case of performing the operation, the electronic device may terminate the processing associated with the touch.

In operation 606, the touch may be recognized as a pressure touch. The electronic device according to an embodiment may recognize the pressure touch as a single pressure touch or a first pressure touch according to an embodiment of the disclosure. The electronic device may determine whether an operation corresponding to the single pressure touch is set and may perform operation 607 or operation 613.

In operation 607, because the operation corresponding to the single pressure touch is set, the electronic device according to an embodiment may provide a GUI implemented such that the operation corresponding to the single pressure touch is selected.

In operation 609, the electronic device according to an embodiment may determine whether the operation corresponding to the single pressure touch is selected at the GUI. When it is determined that the operation is selected, the electronic device may perform operation 611; when it is determined that the operation is not selected, the electronic device may perform operation 613.

In operation 611, the electronic device may perform the selected operation and may terminate the processing associated with the pressure touch.

In operation 613, the electronic device according to an embodiment may recognize the pressure touch as the first touch according to an embodiment of the disclosure. The electronic device may store location data of the first touch in a memory. In an embodiment, the electronic device may perform a specified operation of the first touch in a background.

In operation 615, the electronic device according to an embodiment may sense a touch different from the first touch. Like the first touch, the touch may be made as a direct touch by the user or an indirect touch by various tools.

In operation 617, the electronic device according to an embodiment may determine whether a pressure value of the touch is the specified threshold value or greater. Depending on the determination result, the electronic device may determine whether the touch corresponds to a pressure touch. When the pressure value is smaller than the specified threshold value, the touch may not correspond to a pressure touch, and the electronic device may perform operation 619. When the pressure value is the specified threshold value or greater, the touch may correspond to a pressure touch, and the electronic device may perform operation 621.

In operation 619, because the touch is not recognized as a pressure touch, the electronic device according to an embodiment may recognize the touch as an independent, single touch and may perform an operation corresponding to the touch. In the case of performing the operation, the electronic device may terminate the processing associated with the touch, may maintain a standby state for the second touch according to an embodiment of the disclosure, and may perform operation 615.

In operation 621, because the touch is recognized as a pressure touch, the electronic device according to an embodiment may recognize the touch as the second touch according to an embodiment of the disclosure.

In operation 623, the electronic device according to an embodiment may perform a specified operation of utilizing location data of the first touch and the second touch as an input.

Through the operations, the electronic device may perform a specified operation corresponding to a plurality of pressure touches.

Figure 7:
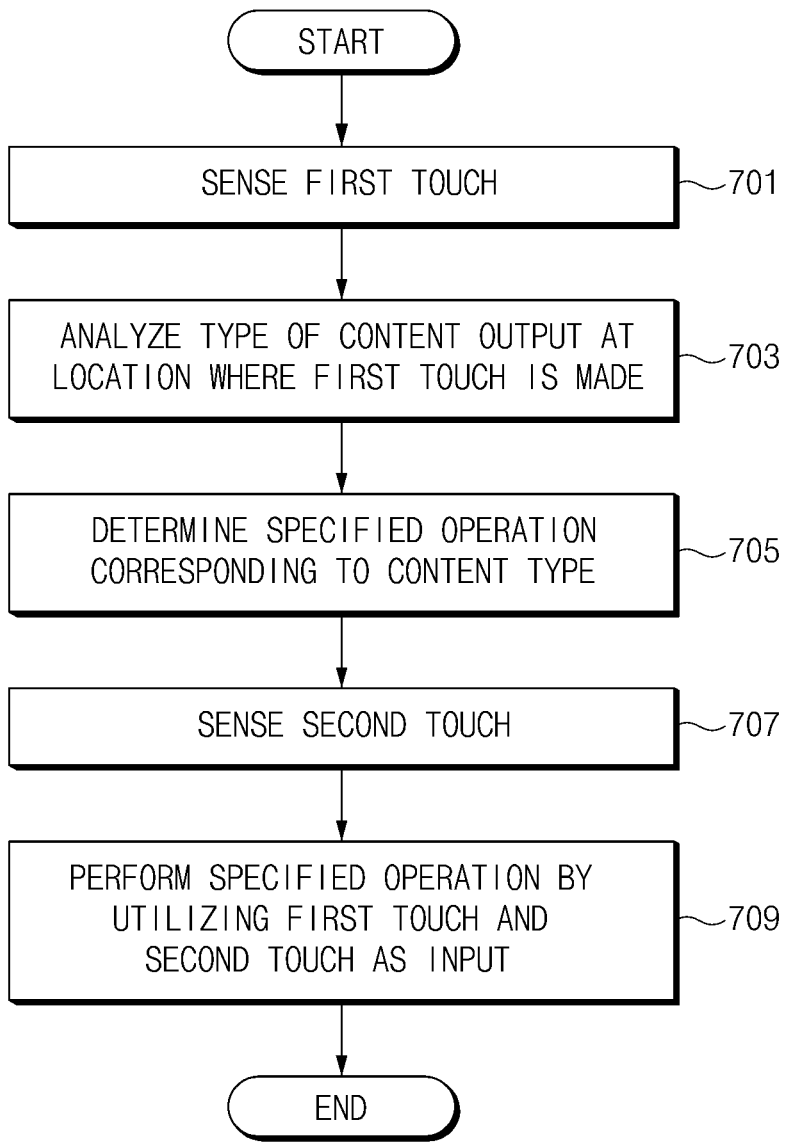
FIG. 7 illustrates a flowchart in which an electronic device performs a specified operation based on a type of content output at a location where a first touch is made, according to an embodiment.

FIG. 7 illustrates a flowchart in which an electronic device performs a specified operation based on a type of content output at a location where a first touch is made, according to an embodiment.

Referring to FIG. 7, according to an embodiment, a method for performing a specified operation based on a type of content output at a location where a first touch is made may include operation 701 to operation 709. Operation 701 to operation 709 may be performed by, for example, the processor 480 illustrated in FIG. 4.

In operation 701, an electronic device according to an embodiment may sense a first touch having a pressure value of a specified threshold value or greater. The first touch may correspond to a pressure touch that is not recognized as a single pressure touch.

In operation 703, the electronic device according to an embodiment may analyze a type of content output at a location where the first touch is made. The type of the content may include, for example, an image, a text, a video, and the like.

In operation 705, the electronic device according to an embodiment may determine a specified operation corresponding to the type of the content. For example, when the type of the content corresponds to an image, the specified operation may correspond to an operation of capturing a screen. For another example, when the type of the content corresponds to a text, the specified operation may correspond to an operation of selecting a text of a range specified by the user.

In operation 707, an electronic device according to an embodiment may sense a second touch that is different from the first touch and has a pressure value of the specified threshold value or greater. In various embodiments, after sensing the first touch and before sensing the second touch, the electronic device may sense a third touch having a pressure value smaller than the specified threshold value. The electronic device may perform an operation corresponding to the third touch, and the operation may be independent of the specified operation corresponding to the first touch and the second touch. The operation corresponding to the third touch may correspond to, for example, an operation of scrolling a screen on which a text is output, an operation of enlarging or reducing an image, or the like.

In operation 709, the electronic device according to an embodiment may perform the operation determined in operation 705, by utilizing the first touch and the second touch as an input. In an embodiment, the operation determined in operation 705 may be performed in a background before the second touch is sensed and may be performed in a foreground in response to sensing the second touch.

Through the operations, the electronic device may perform a specified operation corresponding to a plurality of pressure touches, based on a type of content output at a location where the first touch is made.

Figure 8:
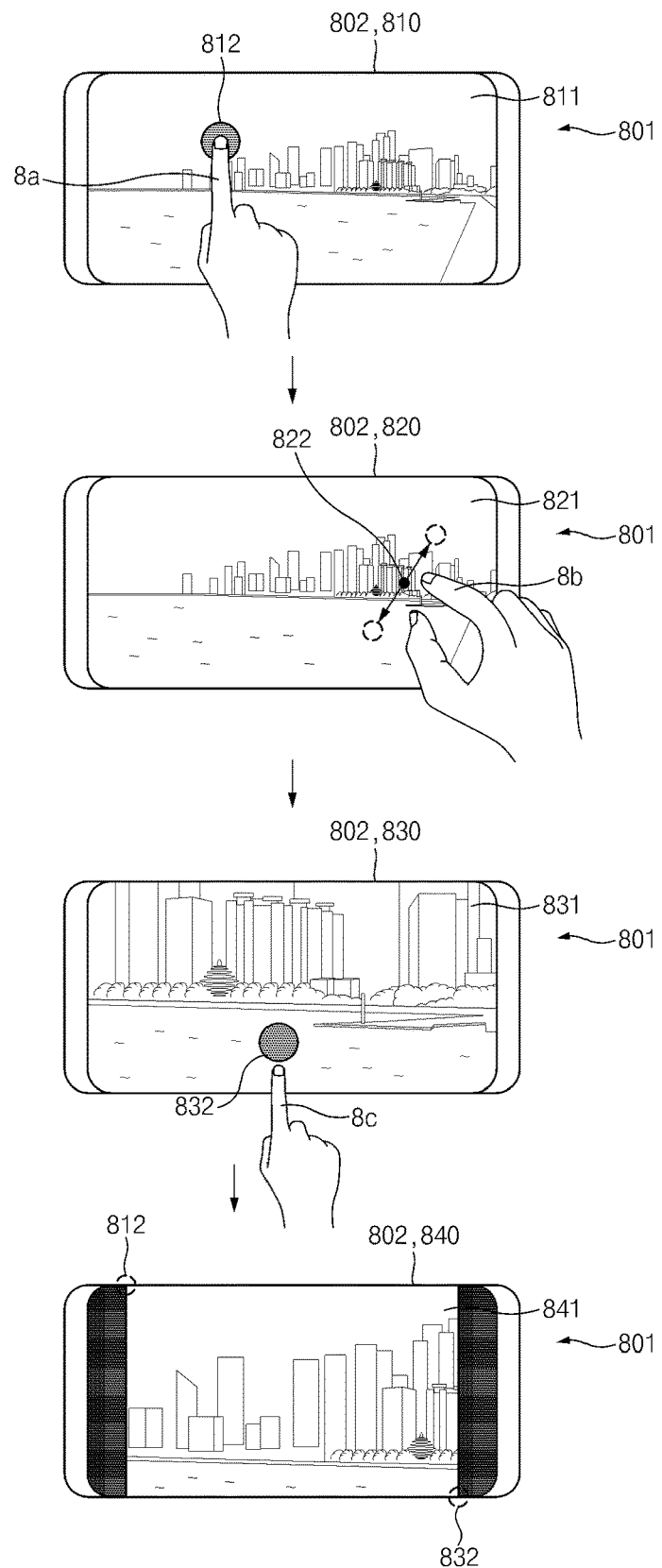
FIG. 8 illustrates an embodiment associated with the case where content output at a location where a first touch is made at an electronic device is an image file, according to an embodiment.

FIG. 8 illustrates an embodiment associated with the case where content output at a location where a first touch is made is an image file, according to an embodiment.

Referring to FIG. 8, a screen 810, 820, 830, or 840 including an image 811, 821, 831, or 841 may be output on a display 802 of an electronic device 801.

According to an embodiment, any image 811, 821, 831, or 841 may be included in all or a portion of the screen 810, 820, 830, or 840. According to an embodiment, a first touch 8a may be made on the screen 810 of the electronic device 801. In an embodiment, when the first touch 8a is made, the electronic device 801 may analyze a type of content output at a location 812 where the first touch 8a is made. In the screen 810 of the electronic device 801, because the image is being output at the location 812 where the first touch 8a is made, the electronic device 801 may determine the type of the content as an image.

According to an embodiment, because the type of the content corresponds to an image, the electronic device 801 may perform an operation (an embodiment of a specified operation) of capturing a specific area of the image as a specified operation.

In an embodiment, in the case where the first touch 8a is made on the screen 810 of the electronic device 801, the electronic device may execute a capture application for the operation of capturing the specific area of the image 811 in a background. The electronic device 801 may utilize first location data of the first touch 8a as a first input. The electronic device 801 may use coordinates on the image 811 corresponding to the location 812 where the first touch 8a is made, as a first input of the capture application.

According to an embodiment, after the first touch 8a is made, the electronic device 801 may sense at least one or more touches having a pressure value smaller than a specified threshold value.

For example, a touch 8b (e.g., pinch in) that is made at one location 822 with a pressure value smaller than the specified threshold value and moves in opposite directions may be sensed on the screen 820 of the electronic device 801. In an embodiment, in the case where the touch 8b is made, an operation corresponding to the touch 8b may correspond to an operation of enlarging the image 821. The operation of enlarging the image 821 may be independent of an operation of capturing a specific area of the image. In various embodiments, the touch 8b may be omitted.

According to an embodiment, the image 831 enlarged by the touch 8b having the pressure value smaller than the specified threshold value may be output on the display 802, and a second touch 8c may be made on the screen 830 on which the enlarged image 831 is output.

In an embodiment, when the second touch 8c is made, the electronic device 801 may perform an operation of capturing an area specified by the first location data and the second location data of the second touch 8c. For example, there may be captured the image 841 specified by coordinates of the image corresponding to the location 812 where the first touch 8a is made and coordinates of the image corresponding to a location 832 where the second touch 8c is made. After the second touch 8c is sensed, the capture application for an operation of capturing the image 841 may be executed in a foreground, not a background, and the captured image 841 may be output on the screen 840 of the electronic device 801.

Figure 9:
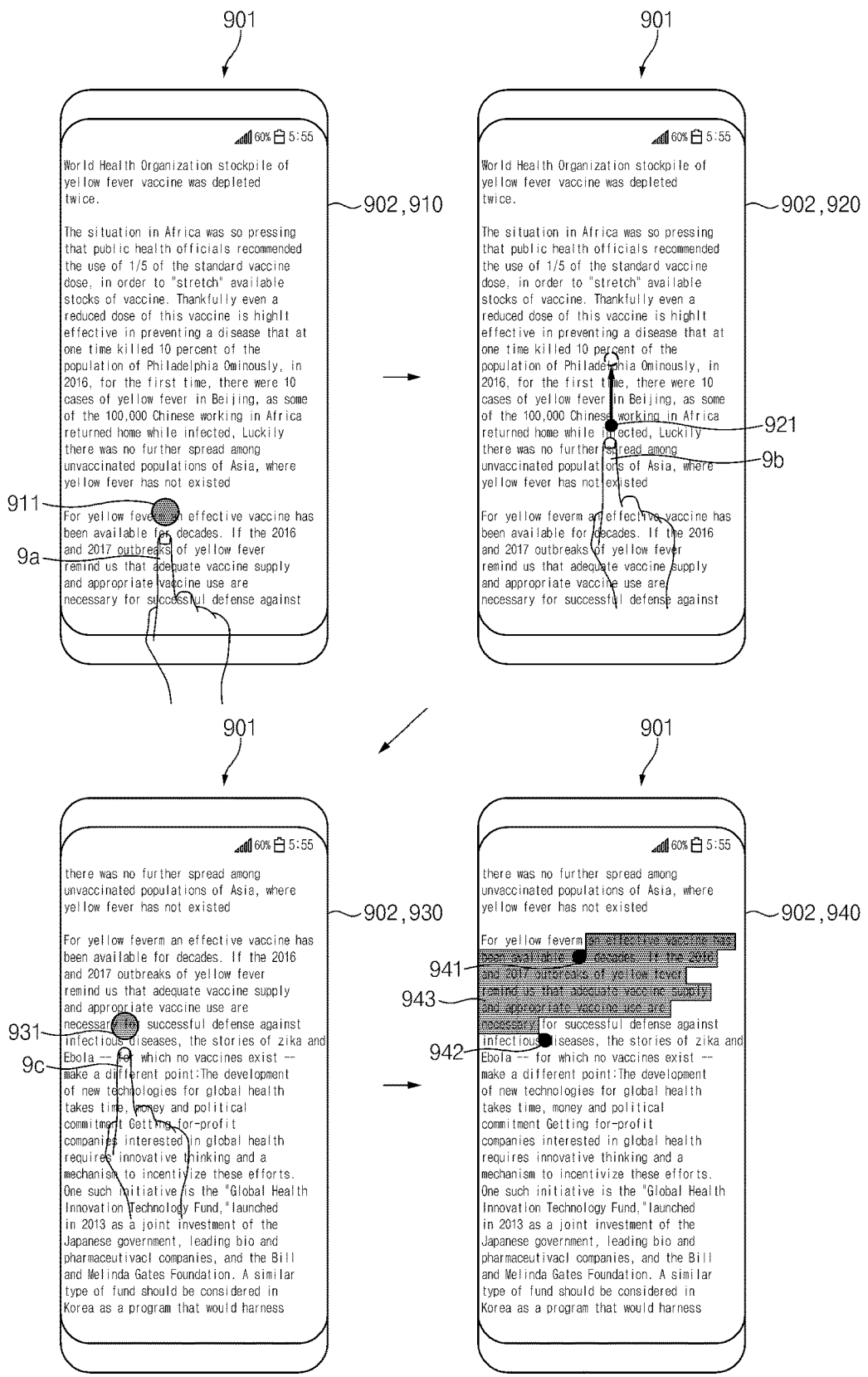
FIG. 9 illustrates an embodiment associated with the case where content output at a location where a first touch is made at an electronic device is a text file, according to an embodiment.

FIG. 9 illustrates an embodiment associated with the case where content output at a location where a first touch is made is a text file, according to an embodiment.

Referring to FIG. 9, an electronic device 901 in which a screen 910, 920, 930, or 940 on which a text is displayed is being output on a display 902 is illustrated.

According to an embodiment, any text file may be output on all or a portion of the screen 910, 920, 930, or 940 of the electronic device 901. According to an embodiment, a first touch 9a may be made on the screen 910 of the electronic device 901. In an embodiment, when the first touch 9a is made, the electronic device 901 may analyze a type of content output at a location 911 where the first touch 9a is made. In the screen 910 of the electronic device 901, because the text file is being output at the location 911 where the first touch 9a is made, the electronic device 901 may determine the type of the content as a text.

According to an embodiment, because the type of the content corresponds to a text, the electronic device 901 may perform an operation (an embodiment of a specified operation) of selecting a specific range of the text as a specified operation.

In an embodiment, in the case where the first touch 9a is made on the screen 910 of the electronic device 901, the electronic device 901 may utilize first location data of the first touch 9a as a first input of the operation of selecting the specific range of the text. For example, the electronic device 901 may use a character corresponding to the location 911 where the first touch 9a is made, as the first input of the specified operation. According to an embodiment, the electronic device may perform the operation of selecting the specific range of the text in a background.

According to an embodiment, after the first touch 9a is made, the electronic device 901 may sense at least one or more touches 9b having a pressure value smaller than a specified threshold value.

For example, the touch 9b that is made at one location 921 with a pressure value smaller than the specified threshold value and vertically moves may be sensed on the screen 920 of the electronic device 901. In an embodiment, in the case where the touch 9b is made, an operation corresponding to the touch 9b may correspond to an operation of scrolling the screen 920 on which the text is being output. The scrolling operation may be independent of the operation of selecting the specific range of the text. In various embodiments, the touch 9b may be omitted.

According to an embodiment, a new text portion may be output on the display 902 by the touch 9b having the pressure value smaller than the specified threshold value, and a second touch 9c may be made at a specific location 931 of the screen 930 on which the text is output.

According to an embodiment, when the second touch 9c is made, the electronic device may utilize second location data of the second touch 9c as a second input of the specified operation. For example, there may be selected a text 943 from a character 941 corresponding to the first location data to a character 942 corresponding to the second location data. After the second touch 9c is sensed, the operation of selecting the text may be performed in a foreground, not a background.

Figure 10:
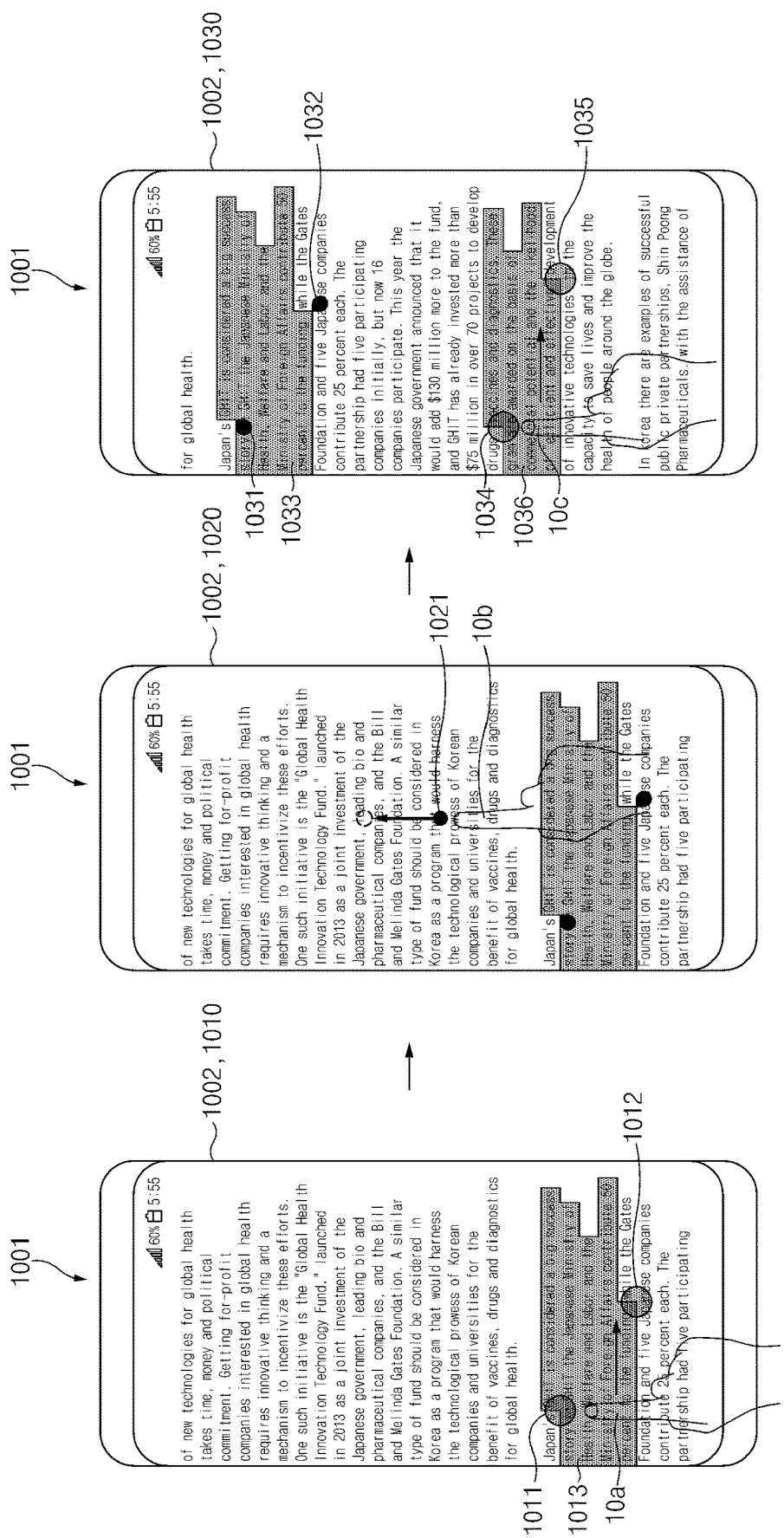
FIG. 10 illustrates an embodiment associated with the case where a touch involves a gesture and content output at a location where a first touch is made is a text file, according to an embodiment.

FIG. 10 illustrates an embodiment associated with the case where a touch involves a gesture and content output at a location where a first touch is made is a text file, according to an embodiment.

Referring to FIG. 10, an electronic device 1001 in which a screen 1010, 1020, and 1030 on which a text is displayed is being output on a display 1002 is illustrated.

According to an embodiment, any text file may be output on all or a portion of the screen 1010 of the electronic device 1001. According to an embodiment, a first touch 10a according to an embodiment of the disclosure, which has a pressure value of a specified threshold value or greater, may be made on the screen 1010 of the electronic device 1001.

In an embodiment, the first touch 10a may involve a gesture that moves with the pressure value of the specified threshold value or greater maintained. In this case, first location data of the first touch 10a may include data of a start location 1011 of the first touch 10a and an end location 1012 thereof. According to an embodiment, when the first touch 10a is sensed, there may be selected a text 1013 from the start location 1011 of the first touch 10a to the end location 1012 thereof.

In an embodiment, when the first touch 10a is made, the electronic device 1001 may analyze a type of content output at the locations 1011 and 1012 where the first touch 10a is made. In the screen 1010 of the electronic device 1001, because the text file is being output at the locations 1011 and 1012 where the first touch 10a is made, the electronic device 1001 may determine the type of the content as a text.

According to an embodiment, because the type of the content corresponds to a text, the electronic device 1001 may perform an operation (an embodiment of a specified operation) of selecting a specific range of the text as a specified operation. The specific range of the text may include a continuous text range or a discontinuous text range.

In an embodiment, in the case where the first touch 10a is made on the screen 1010 of the electronic device 1001, the electronic device 1001 may utilize first location data of the first touch 10a as a first input. According to an embodiment, the electronic device 1001 may perform the operation of selecting the specific range of the text in a background.

According to an embodiment, after the first touch 10a is made, the electronic device 1001 may sense at least one or more touches having a pressure value smaller than a specified threshold value.

For example, a touch 10b that is made at one location 1021 with a pressure value smaller than the specified threshold value and vertically moves may be sensed on the screen 1020 of the electronic device 1001. In an embodiment, in the case where the touch 10b is made, an operation corresponding to the touch 10b may correspond to an operation of scrolling the screen 1020 on which the text is being output. The scrolling operation may be independent of the operation of selecting the specific range of the text. In various embodiments, the touch 10b may be omitted.

According to an embodiment, a new text portion may be output by the touch 10b having the pressure value smaller than the specified threshold value, and a second touch 10c may be made on the screen 1030 on which the text is output.

In an embodiment, the second touch 10c may involve a gesture that moves with the pressure value of the specified threshold value or greater maintained. In this case, second location data of the second touch 10c may include data of a start location 1034 of the second touch 10c and an end location 1035 thereof. According to an embodiment, when the second touch 10c is sensed, there may be selected a text 1036 from the start location 1034 of the second touch 10c to the end location 1035 thereof.

According to an embodiment, when the second touch 10c is made, an operation of selecting a text 1033 specified by the first location data and the text 1036 specified by the second location data. After the second touch 10c is sensed, the operation of selecting the text may be performed in a foreground, not a background.

Figure 11:
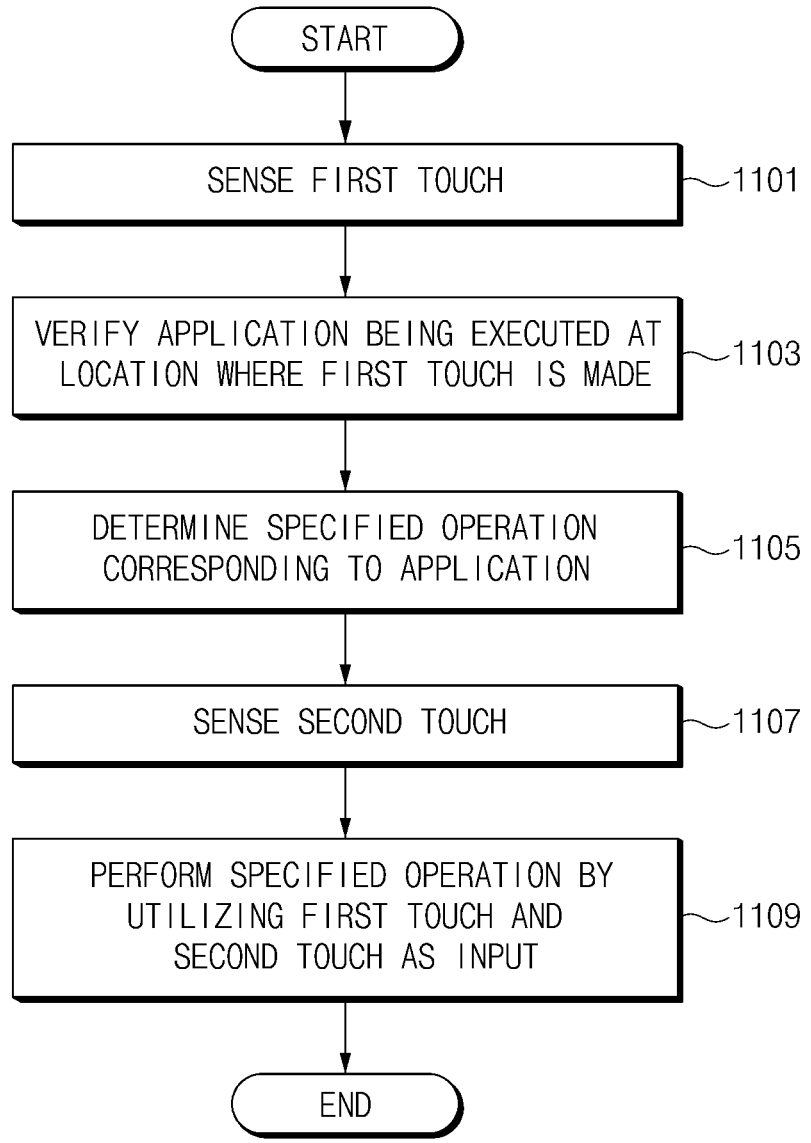
FIG. 11 illustrates a flowchart in which an electronic device performs a specified operation based on an application being executed at a location where a first touch is made, according to an embodiment.

FIG. 11 illustrates a flowchart in which an electronic device performs a specified operation based on an application being executed at a location or a time at which a first touch is made, according to an embodiment.

Referring to FIG. 11, according to an embodiment, a method for performing a specified operation based on an application being executed at a location or a time at which a first touch is made may include operation 1101 to operation 1109. Operation 1101 to operation 1109 may be performed by, for example, the processor 480 illustrated in FIG. 4.

In operation 1101, an electronic device according to an embodiment may sense a first touch having a pressure value of a specified threshold value or greater. The first touch may correspond to a pressure touch that is not recognized as a single pressure touch.

In operation 1103, the electronic device according to an embodiment may analyze an application being executed at the location where the first touch is made. The application may include, for example, a map application, a navigation application, a message application, a sound source player application, or the like.

In operation 1105, the electronic device according to an embodiment may determine a specified operation corresponding to the application. For example, when the application corresponds to a map application, the specified operation may correspond to an operation of searching for an optimum path. For another example, when the application corresponds to a sound source player application, the specified operation may correspond to an operation of repeatedly playing a sound source list of a range specified by the user.

In operation 1107, the electronic device according to an embodiment may sense a second touch that is different from the first touch and has a pressure value of the specified threshold value or greater. In various embodiments, after sensing the first touch and before sensing the second touch, the electronic device may sense a third touch having a pressure value smaller than the specified threshold value. The electronic device may perform an operation corresponding to the third touch, and the operation may be independent of the specified operation corresponding to the first touch and the second touch. The operation corresponding to the third touch may correspond to, for example, an operation of enlarging or reducing a map that is output on a screen.

In operation 1109, the electronic device according to an embodiment may perform the operation determined in operation 1105, by utilizing the first touch and the second touch as an input. In an embodiment, the operation determined in operation 1105 may be performed in a background before the second touch is sensed and may be performed in a foreground in response to sensing the second touch.

Through the operations, the electronic device may perform a specified operation corresponding to a plurality of pressure touches, based on an application being executed at a location where the first touch is made.

Figure 12:
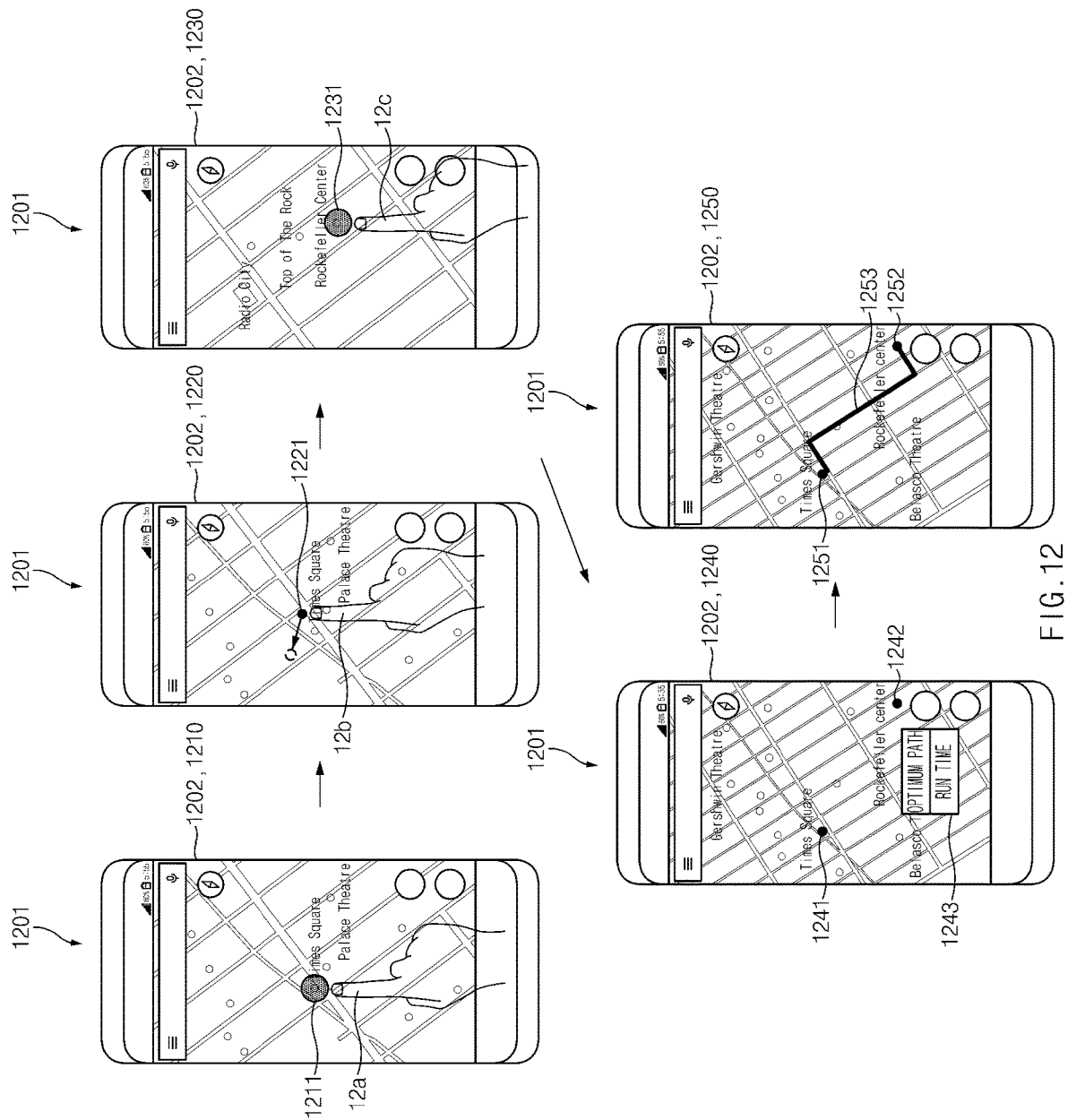
FIG. 12 illustrates an embodiment associated with the case where an application being executed at a location where a first touch is made is a map application, according to an embodiment.

FIG. 12 illustrates an embodiment associated with the case where an application being executed at a location where a first touch is made is a map application, according to an embodiment.

Referring to FIG. 12, an electronic device 1201 where a map application is being executed is illustrated.

According to an embodiment, an execution screen 1210, 1220, 1230, or 1240 of the map application may be output on all or a portion of a display of the electronic device 1201. According to an embodiment, a first touch 12a may be made on the screen 1210 of the electronic device 1201. In an embodiment, when the first touch 12a is made, the electronic device 1201 may verify the application being executed at a location 1211 where the first touch 12a is made. In the screen 1210 of the electronic device 1201, because the map application is being output at the location 1211 where the first touch 12a is made, the electronic device 1201 may determine the application as the map application.

According to an embodiment, because the application corresponds to the map application, the electronic device 1201 may include an operation of searching for an optimum path or an operation of calculating a run time as a specified operation.

In an embodiment, in the case where the first touch 12a is made on the screen 1210 of the electronic device 1201, the electronic device 1201 may utilize first location data of the first touch 12a as a first input. In an embodiment, the electronic device 1201 may use a geographical location (e.g., a times square) corresponding to the location 1211 where the first touch 12a is made, as the first input.

According to an embodiment, after the first touch 12a is made, the electronic device 1201 may sense at least one or more touches having a pressure value smaller than a specified threshold value.

For example, a touch 12b that is made at one location 1221 with a pressure value smaller than the specified threshold value and moves to any other location may be sensed on the screen 1220 of the electronic device 1201. In an embodiment, in the case where the touch 12b is made, an operation corresponding to the touch 12b may correspond to an operation in which a geographical area on a map being output on the display 1202 is changed based on a movement direction of the touch.

In an embodiment, in the case where the touch is made, the operation corresponding to the touch may be independent of the operation of searching for an optimum path or the operation of calculating a run time. In various embodiments, the touch 12b may be omitted.

According to an embodiment, a new geographical area may be output on the display 1202 by the touch 12b having the pressure value smaller than the specified threshold value, and a second touch 12c may be made at a specific location 1231 of the screen 1230 on which the new geographical area is output.

According to an embodiment, when the second touch 12c is made, the electronic device 1201 may perform a specified operation of utilizing the first location data and the second location data of the second touch 12c.

In an embodiment, a first object (e.g., a times square) may be output at the location 1211 that the first location data indicate, and a second object (e.g., a rockefeller center) may be output at the location 1231 that the second location data indicate. In this case, the specified operation may utilize data (e.g., a geographical location of the times square) linked to the first object as a first input and may utilize data (e.g., a geographical location of the rockefeller center) linked to the second object as a second input.

According to an embodiment, the specified operation may include a plurality of operations. For example, the electronic device 1201 may include a first operation (e.g., an operation of searching for an optimum path) or a second operation (e.g., an operation of calculating a run time) with regard to the first object (e.g., the times square) 1241 and the second object (e.g., the rockefeller center) 1242 output on the screen 1240 of the display 1202. In this case, the electronic device 1201 may output, to the screen 1240, a GUI 1243 implemented to select one of the plurality of operations.

According to an embodiment, when an additional touch of the user is made on the output GUI 1243, one of the first operation or the second operation may be selected. When the additional touch is made, the electronic device 1201 may perform a specified operation (e.g., searching for an optimum path) on a first object (e.g., the times square) 1251 and a second object (e.g., the rockefeller center) 1252 and may output a result 1253 of the operation to the screen 1250.

An electronic device according to various embodiments of the disclosure may implement functions, which have been implemented as a plurality of typical touches, through a less number of manipulations by using two or more pressure touches. As a result, the user may feel more convenient in utilizing corresponding functions, and may utilize the corresponding functions more actively.

The electronic device according to various embodiments of the disclosure may implement functions, which have been implemented by a complicated manipulation, by using a more intuitive, simple manipulation. As a result, functions may be implemented more variously in type, and the user may utilize the electronic device more widely.

An electronic device according to an embodiment may include a memory, a display, a touch sensor that is included in the display or is coupled to the display and senses a touch, a pressure sensor that detects a pressure value of the touch, and a processor that is electrically connected with the memory, the display, the touch sensor, and the pressure sensor, and the processor may sense a first touch having a pressure value of a specified threshold value or greater at an area, on which the content is output, of an area of the display, by using the touch sensor and the pressure sensor, may store first location data of the first touch in the memory, may sense a second touch at the area on which the content is output, of an area of the display, by using the touch sensor and the pressure sensor, wherein the second touch has a pressure value of the specified threshold value or greater and is made after sensing the first touch, and may perform a specified operation of utilizing the first location data and second location data of the second touch as an input, in response to sensing the second touch.

According to an embodiment, after sensing the first touch and before sensing the second touch, when a third touch having a pressure value smaller than the specified threshold value is sensed, the processor may perform an operation corresponding to the third touch, and the operation corresponding to the third touch may be independent of the specified operation.

According to an embodiment, in the electronic device, a first object may be output at a location of the display, which the first location data indicate, a second object may be output at a location of the display, which the second location data indicate, and the specified operation may utilizes data linked to the first object as a first input and utilizes data linked to the second object as a second input.

According to an embodiment, the specified operation may be determined based on a type of content output at a location of the display, at which the first touch is made.

In an embodiment, when the type of the content is an image, the specified operation may include an operation of capturing an area specified by the first location data and the second location data.

In an embodiment, when the type of the content is a text, the specified operation may include an operation of selecting a text from a character corresponding to the first location data to a character corresponding to the second location data.

In an embodiment, the type of the content may correspond to a text, the first touch and the second touch may involve a gesture moving with the pressure value of the specified threshold value or greater maintained, the first location data may include data of a start location and an end location of the first touch, the second location data may include data of a start location and an end location of the second touch, and the specified operation may include an operation of selecting a text specified by the first location data and a text specified by the second location data.

According to an embodiment, the specified operation may be determined based on an application being executed at a location of the display, at which the first touch is made.

In an embodiment, when the application corresponds to a map application or a navigation application, the specified operation may include an operation of searching for a path between a geographical location corresponding to the first location data and a geographical location corresponding to the second location data.

According to an embodiment, the first touch and the second touch may be made within a specified area of the display. In an embodiment, the specified area may correspond to an application execution area.

According to an embodiment, the specified operation may include a plurality of operations, and the processor may output, to the display, a graphic user interface (GUI) implemented such that one of the plurality of operations is capable of being selected.

According to an embodiment, the processor may output, to the display, a GUI implemented such that an additional operation linked to the specified operation is capable of being selected.

According to an embodiment, the processor may receive a pressure value of a sensed touch from the pressure sensor in response to receiving location data of the sensed touch from the touch sensor.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 130).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 130) in the form of a program module. The instruction, when executed by a processor (e.g., the processor 120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

The invention claimed is:

1. An electronic device comprising:
  a memory;
  a display on which at least one content is being output;
  a touch sensor included in the display or coupled to the display, and configured to sense a touch;
  a pressure sensor configured to detect a pressure value of the touch; and
  a processor electrically connected with the memory, the display, the touch sensor, and the pressure sensor, wherein the processor is configured to:
sense a first touch having a pressure value of a specified threshold value or greater at an area, on which the content is output, of an area of the display, by using the touch sensor and the pressure sensor;
store first location data of the first touch in the memory;
sense a second touch at the area on which the content is output, of the area of the display, by using the touch sensor and the pressure sensor, wherein the second touch has a pressure value of the specified threshold value or greater and is made after sensing the first touch; and
perform a specified operation of utilizing the first location data and second location data of the second touch as an input, in response to sensing the second touch,
wherein the processor is further configured to:
receive the pressure value of the first touch from the pressure sensor in response to receiving the first location data from the touch sensor; and
receive the pressure value of the second touch from the pressure sensor in response to receiving the second location data from the touch sensor.

2. The electronic device of claim 1, wherein, after sensing the first touch and before sensing the second touch, when a third touch having a pressure value smaller than the specified threshold value is sensed, the processor performs an operation corresponding to the third touch, and
wherein the operation corresponding to the third touch is independent of the specified operation.

3. The electronic device of claim 1, wherein the specified operation utilizes data of the content corresponding to the first location data as a first input and utilizes data of the content corresponding to the second location data as a second input.

4. The electronic device of claim 1, wherein the specified operation is determined based on a type of content output at a location of the display, at which the first touch is made.

5. The electronic device of claim 4, wherein, when the type of the content is an image, the specified operation includes an operation of capturing an area specified by the first location data and the second location data.

6. The electronic device of claim 4, wherein, when the type of the content is a text, the specified operation includes an operation of selecting a text from a character corresponding to the first location data to a character corresponding to the second location data.

7. The electronic device of claim 4, wherein the type of the content corresponds to a text, the first touch and the second touch involve a gesture moving with the pressure value of the specified threshold value or greater maintained, the first location data includes data of a start location and an end location of the first touch, the second location data includes data of a start location and an end location of the second touch, and the specified operation includes an operation of selecting a text specified by the first location data and a text specified by the second location data.

8. The electronic device of claim 1, wherein the specified operation is determined based on an application being executed at a location of the display, at which the first touch is made.

9. The electronic device of claim 8, wherein, when the application corresponds to a map application or a navigation application, the specified operation includes an operation of searching for a path between a geographical location corresponding to the first location data and a geographical location corresponding to the second location data.

10. The electronic device of claim 1, wherein the first touch and the second touch are made within a specified area of the display.

11. The electronic device of claim 10, wherein the specified area corresponds to an application execution area.

12. The electronic device of claim 1, wherein the specified operation includes a plurality of operations, and
wherein the processor outputs, to the display, a graphic user interface (GUI) implemented such that one of the plurality of operations is capable of being selected.

13. The electronic device of claim 1, wherein the processor outputs, to the display, a GUI implemented such that an additional operation linked to the specified operation is capable of being selected.

14. A method for performing an operation in response to a pressure of a touch in an electronic device, the method comprising:
sensing a first touch having a pressure value of a specified threshold value or greater;
storing first location data of the first touch in a memory;
sensing a second touch made after sensing the first touch and having a pressure value of the specified threshold value of greater; and
performing a specified operation of utilizing the first location data and second location data of the second touch as an input, in response to sensing the second touch,
wherein the sensing the first touch comprises sensing the pressure value of the first touch by a pressure sensor in response to sensing the first location data by a touch sensor, and
wherein the sensing the second touch comprises sensing the pressure value of the second touch by the pressure sensor in response to sensing the second location data by the touch sensor.

* * * * *